United States Patent [19]

Russell

[11] 4,090,031
[45] May 16, 1978

[54] MULTI-LAYERED OPITCAL DATA RECORDS AND PLAYBACK APPARATUS

[75] Inventor: James T. Russell, Richland, Wash.

[73] Assignee: Eli S. Jacobs, New York, N.Y.

[21] Appl. No.: 727,369

[22] Filed: Sep. 27, 1976

Related U.S. Application Data

[63] Continuation of Ser. No. 516,453, Oct. 21, 1974, abandoned, which is a continuation-in-part of Ser. No. 375,336, Jul. 2, 1973, Pat. No. 3,891,794.

[51] Int. Cl.² .............................................. G11C 13/04
[52] U.S. Cl. ..................................... 358/130; 365/127
[58] Field of Search .............. 178/6.7 R; 340/173 LM

[56] References Cited

U.S. PATENT DOCUMENTS

| | | | |
|---|---|---|---|
| 3,191,490 | 6/1965 | Rabinow | 340/173 LM |
| 3,848,095 | 11/1974 | Wohlmut | 340/173 LM |
| 3,946,367 | 3/1976 | Wohlmut et al. | 340/173 LM |

*Primary Examiner*—Terrell W. Fears
*Attorney, Agent, or Firm*—Klarquist, Sparkman, Campbell, Leigh, Hall & Whinston

[57] ABSTRACT

Multi-layered optical data records and playback apparatus are described in which a plurality of optical data layers are provided on at least one side of a record substrate and the playback apparatus scans data tracks on such layers with a light beam to produce an electrical readout signal corresponding to the data in the scanned tracks. The playback apparatus includes selection means for selectively playing back data tracks on different ones of the data layers. The data track may be formed by lines of data spots of binary coded digital information or such spots may be frequency modulated or pulse length modulated analog information which are photographically recorded at extremely high data density so that they may be used to record audio or video signals including television signals. While the optical data records may be light transparent, they are preferably light reflective so that the playback light source and associated focusing and scanning means may be supported on the same side of the record as the light detector to provide a more compact playback apparatus. This also enables at least some of the same optical elements to be used for transmitting the reflected light beam to the detector that are used for transmitting the playback light beam from the light source to the record. Selection of one data track for playback may be accomplished by changing the focus of the light beam from one data layer to another, or by making the data tracks of optically different materials, such as using different color dyes or different photoluminescent materials, and selectively positioning corresponding color filters in front of the light detectors.

12 Claims, 8 Drawing Figures

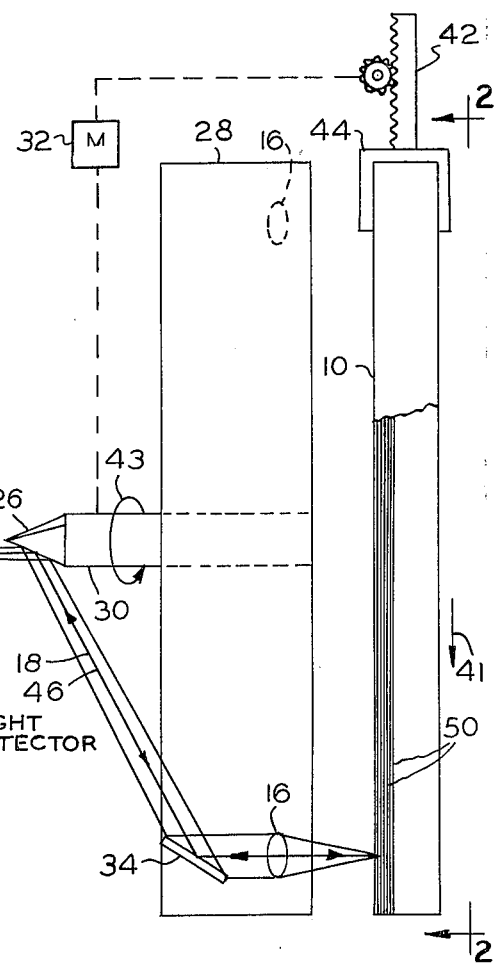
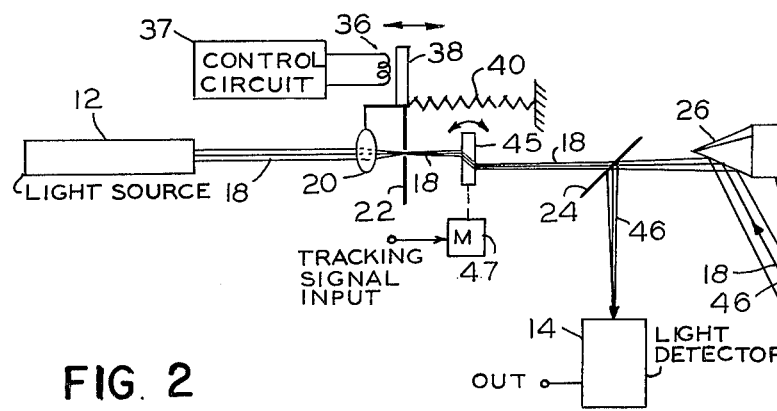
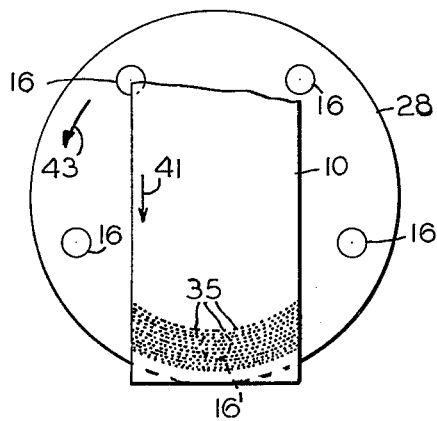
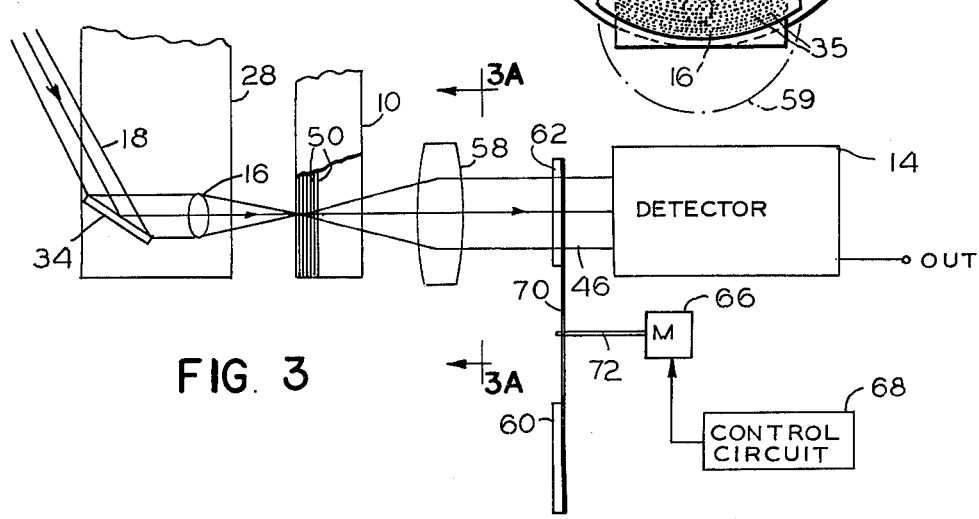
FIG. 1
FIG. 2
FIG. 3A
FIG. 3

MULTI-LAYERED OPITCAL DATA RECORDS AND PLAYBACK APPARATUS

REFERENCE TO RELATED PATENT APPLICATION

This is a continuation of application Ser. No. 516,453, now abandoned, filed Oct. 21, 1974, which is a continuation-in-part of application Ser. No. 375,336, filed July 2, 1973 by J. T. Russell now U.S. Patent No. 3,891,794.

BACKGROUND OF THE INVENTION

The subject matter of the present invention relates generally to multiple layer optical data records and associated playback apparatus, and in particular to such records which include a plurality of data information tracks in different data layers provided on at least one side of the record substrate or base member, and to such playback apparatus which includes selection means for selectively reading out one of such data tracks with a scanning light beam to produce an electrical readout signal corresponding to the data on the scanned track. The multi-layered records and playback apparatus of the present invention are extremely useful for high density information storage. For example, one application of the present invention is the recording and playing back of audio and video signals used in television programs.

Previously it has been suggested in U.S. Pat. No. 3,430,966 of D. P. Gregg, granted Mar. 4, 1969, and U.S. Pat. No. 3,518,442 of K. O. Johnson, granted June 30, 1970, to provide an optical data record in which data is recorded by notches in two tracks on opposite sides of a light transmissive substrate member. However, such prior art records and their associated playback apparatus have several disadvantages since the records only have one data layer per side and are read out by transmitting a light beam through the record including a light diffusing layer provided between the two data layers. As a result, these records cannot store as much data as the record of the present invention and are more expensive and difficult to manufacture. Also, the playback apparatus requires separate focusing optical systems for the light detector and for the light source because they are on opposite sides of the record. Thus, the playback apparatus is not as compact as the embodiment of the present invention employing reflective records because in the latter the detector is positioned on the same side of the record as the light source.

It has been proposed by K. Compaan and P. Kramer in *Philips Technical Review*, Volumne 33, pages 178 to 180, 1973 No. 7, to employ light reflecting optical data records so that the detector and light source may be positioned on the same side of the record and may use common optical elements. However, this record has the disadvantage that optical data is recorded as pits or notches in a single layer which is formed in a conventional manner by pressing the records from a master. As a result, only about thirty minutes of television programs can be recorded on a large record of 30 centimeters in diameter, the size of a conventional long playing phonograph record. The entire surface of the record, including the data pits, is coated with metal for reflecting the light beam so that several data layers could not be recorded on the same side of the record in the manner of the present invention. The data pits, unlike the background surface, reflect the light beam away from the detector and are detected by the absence of light at the detector so that there is a lower signal to noise ratio in the electrical readout signal than that of the present invention.

Also of interest as a background on optical data records and playback systems for fixed records in U.S. Pat. No. 3,501,586, granted Mar. 17, 1970, to J. T. Russell. However, this patent does not disclose multi-layered data records in the manner of the present invention.

SUMMARY OF THE INVENTION

It is, therefore, one object of the present invention to provide an improved optical data record of higher storage density having a plurality of data tracks recorded in different data layers on at least one side of the record substrate.

Another object of the invention is to provide such a multi-layered data record of simple and economical construction which is provided with optical data tracks of high accuracy without forming pits or grooves in the record surface.

A further object of the invention is to provide such a multi-layered data record of light reflective material so that it may be played back by using a light source and detector positioned on the same side of the record and using at least some of the same optical elements to provide a more compact and less expensive playback apparatus.

Still another object of the present invention is to provide such a record in which the light reflected from the data spots is detected to produce an electrical readout signal of high signal to noise ratio.

An additional object of the present invention is to provide an improved playback apparatus including a selection means for selectively playing back the data tracks on different data layers provided on such a multi-layered data record.

Another object of the invention is to provide such a playback apparatus which selects the data tracks to be played back by changing the focus of the readout light beam from one track to another in a simple, accurate manner.

A still further object of the present invention is to provide such an improved playback apparatus and record in which the data tracks are selectively played back by providing the data layers with different optical properties and detecting only light with the optical property of the selected data track.

BRIEF DESCRIPTION OF THE DRAWINGS

Other objects and advantages of the present invention will be apparent from the following detailed description of the preferred embodiments thereof and from the attached drawings of which:

FIG. 1 is a schematic diagram of one embodiment of a playback apparatus for a reflective type of multi-layer optical data record in accordance with the present invention;

FIG. 2 is an elevation view taken along the line 2—2 of FIG. 1;

FIG. 3 is a schematic diagram of a second embodiment of a playback apparatus similar to that of FIG. 1 but modified for light transmissive type multi-layer optical data records;

FIG. 3A is an elevation view taken along the line 3A—3A of FIG. 3.

DESCRIPTION OF PREFERRED EMBODIMENT

Figure 4:
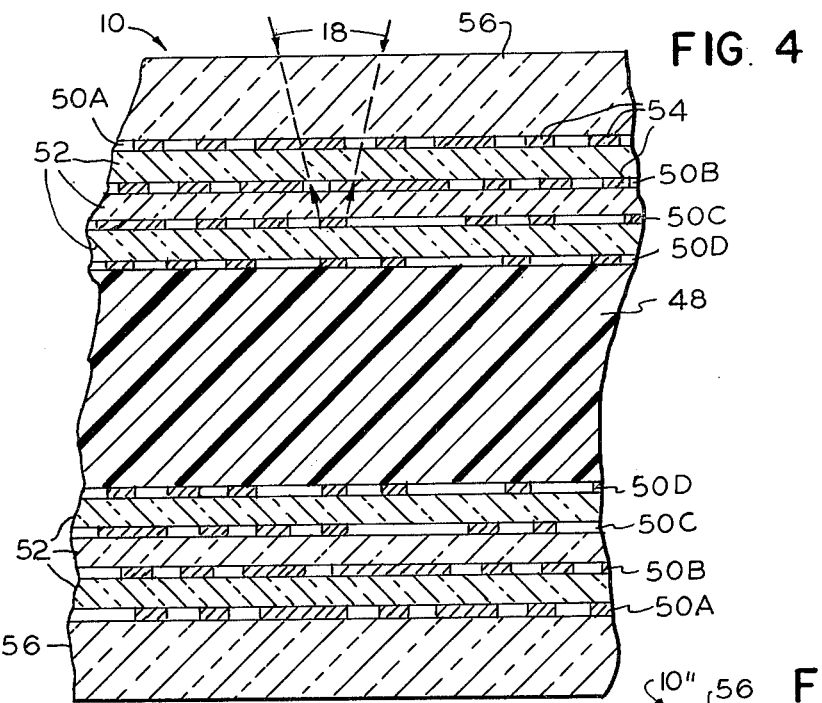
FIG. 4 is an enlarged section view of a portion of a multi-layer optical data record with spacer layers between the data layers which may be used in the playback apparatus of FIGS. 1 or 3.

As shown in FIGS. 1 and 2, a multi-layered optical data record 10 of the reflective type, such as that shown in FIG. 4 which employs light reflecting material for the data spots or for the background regions surrounding transparent data spots, is played back with a playback apparatus including a light source 12 and a light detector 14 positioned on the same side of the record. This reflective playback apparatus has the advantages of providing a more compact apparatus and enabling the use of at least some of the optical elements including the objective lenses 16 in the same light paths for the light reflected from the record 10 to the detector 14 and for the light transmitted from source 12 to the record. This reduces the cost and causes some of the defects of the optical system, such as lens aberration, to be cancelled as a result of the light beam traversing the elements twice in opposite directions.

The light source 12 may be a laser which produces "coherent" light of one or more narrow frequency bands, or a suitable source of intense noncoherent "white" light of many frequencies, including ultraviolet light, infrared light, as well as visible light. A light beam 18 is transmitted from source 12 through a primary lens 20 and an apertured light mask commonly referred to as a "pin hole" element 22. Lens 20 focus the light beam to a small spot at the circular aperture of the pin hole element so that such aperture shapes the light spot and forms the object that is imaged onto the record by the objective lenses 16. The light beam 18 is transmitted through a beam splitting mirror 24 onto a rotating distributor mirror member 26 whose outer surface is in the form of a five-sided polygon having five mirrors provided thereon which correspond to five objective lenses 16 which are carried on a rotating scanner wheel 28. The distributor mirror member 26 is mounted on the shaft 30 of the scanner wheel 28 so that it is rotated with such wheel at a constant speed by an electrical motor 32 coupled thereto. As a result, the distributor mirror member 24 rotates at the same speed as the objective lenses 16 so that one of the mirrors of such distributor member is always aligned with its associated objective lens. Thus, the distributor mirror member 26 distributes the light beam to the objective lenses 16 one at a time as such lenses rotate across the record 10 to playback one of the data track lines 35 on such record as shown in FIG. 2.

The light beam 18 is reflected from one of the distributor mirrors onto one of five objective mirrors 34 mounted on the scanner wheel 28 immediately beneath each objective lens 16. As a result, the light beam is reflected from the objective mirror 34 through its associated objective lens 16 onto the multi-layer optical data record 10. The light beam is focused by lenses 20 and 16 to a small spot in a focus plane on one of the data layers of the record, such spot being of a diameter which is substantially the same size as the width of one of the data track lines 35 of data spots provided on such record.

A selection means is provided for moving the focus plane from one data layer to another to selectively playback the selected data track on such layers. This change in the focus plane may be accomplished by moving the pin hole light mask 22 and the primary lens 20 longitudinally along the beam axis by means of an electromagnetic coil 36 and associated electrical control circuit. The coil 36 attracts or repels a magnetic armature 38 on which the pin hole mask 22 is mounted so that it and the lens 20 coupled thereto move toward and away from the record 10. A spring biasing element 40 may be used for mounting the pin hole light mask 22 which resists the electromagnetic force of the coil 36 for more accurate adjustment of the mask. However, it should be noted that in view of the great distance of the light mask 22 from the record 10, the motion of the object formed by the pin hole in mask 22 relative to the motion of the light spot image in the focus plane is equal to the square of the magnification which is approximately 10. Therefore, the mask 22 must move about 100 times farther than the resulting movement of the focus plane of the light spot on the record. This enables accurate adjustment of the focus plane which is required for selective playback of one of the data layers in view of the extremely small distances between data layers.

The light spot focused on the record is scanned along one line 35 of the data track without overlapping adjacent track lines. This scanning in a longitudinal or "X" direction along the track lines is accomplished by rotation of the scanner wheel 28 at a speed of about 2500 RPM for a four and one-half inches radius to the center of the objective lenses. To scan from line to line in the transverse or "Y" direction, the data record 10 is moved slowly downward in the direction of arrow 41 in any suitable manner, such as by a worm gear apparatus 42 which moves a carriage 44 supporting the record and is suitably geared to the motor 32. The speed of longitudinal movement of the record 10 is about 420 microns per second for playing back a television signal on a record 5 inches wide. As a result, each objective lens 16 scans a separate data track line 35 of the data track on one data layer of the record 10 as the scanner wheel 28 is rotated in the direction of arrow 43.

The scanning light beam 18 is reflected from the data spots or the surrounding background as a modulated readout light beam back through the objective lens 16 to the objective mirror 34 and distributor mirror 26 to the beam splitter mirror. The beam splitter mirror 24 reflects the modulated readout light beam 46 to the detector 14 which is a photoelectric cell that produces an electrical output signal corresponding to the modulated light beam. This electrical readout signal is transmitted to the video input of the television receiver or other utilization device connected to the output of the detector through a suitable amplifier and decoder system (not shown).

A "tipping" plate 45 which laterally displaces the light beam 18 by refraction of such beam is provided between the pin hole mask 22 and the beam splitter mirror 24. The tipping plate is pivoted by a galvanometer type motor 47 in response to a tracking signal applied to its input for changing the magnitude and direction of the lateral displacement of the light beam 18 in order to cause such beam to stay on the data track being scanned. The tracking signal is produced by a servo system connected to the output of the detector 14 as is shown in copending U.S. patent application Ser. No. 481,131, filed June 26, 1974, by R. A. Walker.

It should be noted that the light beam 18 is not coaxial with the distributor shaft 30 but strikes the distributor mirrors 26 at a slight back angle which is less than the angle between the reflecting surfaces of such mirrors and the shaft axis. As a result the reflected light beam rotates at a speed slightly less than that of shaft 30 and fully illuminates the objective lenses with a substantially uniform intensity over the entire data line 35. This is necessary because if the light beam is parallel to the shaft axis when it strikes the distributor mirrors 26, the reflected beam will rotate at the same speed as the objective lenses. This would cause the objective lenses to be illuminated with only about one-half the beam intensity at their switching positions where the beam is transferred from one lens to another by the distributor.

As shown in FIG. 4, one embodiment of the multi-layer optical data record 10 includes a record substrate or base member 48 of a suitable plastic material, glass, ceramic or metal, which may be light opaque for reflective type records or light transparent for light transmission type records. A plurality of data layers 50A, 50B, 50C and 50D are provided on one or both sides of the substrate member 48. The data layers are separated by transparent plastic spacer layers 52 which may be made of the same material as the substrate member 48. Each of the data layers has a series track or parallel tracks of data spots 54 formed by spaced track lines 35 on the record, as shown in FIG. 1. The data spots are separated by spaces and may represent binary coded digital information or frequency modulated or pulse width modulated analog information.

The data layers 50A to 50D may be made of photosensitive material, such as photographic film, in which case the spacer layers are provided as the film backing. However, the data layers may also be made by other suitable recording material including printing ink, in which case the data spots 54 could be made of light opaque black material and the background made of transparent material for light transmissive type records. However, the data spots 54 may also be made of light reflecting metal material formed by vapor deposition through a mask having apertures corresponding to the data spots, or by etching through a photoresist mask formed by exposure to a light image of the data spots in a conventional manner such as is used to form etched electrical circuit boards. The thickness of the spacer layers 52 is greater than the depth of focus of the objective lenses 16 so that when the light beam 18 is focused on one of the data layers, the remaining data layers are out of focus and do not block the light beam appreciably, as shown in FIG. 4. A protective layer 56 of transparent plastic is provided over the outermost data layer 50A to provide protection against mechanical abrasion of the data layers and to prevent the dust which settles on the surface of the record from blocking light to the data layers, by spacing the dust from such data layers. Thus, any dust which collects on the outer surface of the protective layer 56 is out of focus with respect to the light spot focused on any of the data layers. For this reason, the protective coating 56 may have a coating of about 10 mils while the spacer layers 52 may have a thickness of about 5 mils and the substrate base member 48 has a thickness of about ⅛ inch, depending upon the material used for such substrate.

When the record of FIG. 4 is of a light transmissive type record, the data spots 54 are preferably made of light opaque material, while the surrounding background areas of the data layers are made of light transparent material, as is the record substrate 48. This light transmissive type record may be played back by modifying the playback apparatus of FIG. 1, as shown in FIG. 3. This, the light detector 14 is moved to the opposite side of the record 10 from the light source 12 and aligned with the light beam transmitted through the record 10 by the objective lens 16. An arcuate lens segment 58 is positioned between the detector 14 and the record, such lens segment having a short focal length on the order of six inches and a field of view which covers the entire width of the record element 10, as shown in FIG. 3A, so that such lens may be held in a fixed position during scanning. The arcuate lens segment 58 is cut from a large circular lens shown by dashed lines 59 in FIG. 3A. It should be noted that the beam splitting mirror 24 is eliminated in the embodiment of FIG. 3.

While the selection means including coil 36 and its control circuit 37 may be employed to change the focus of the light beam 18 onto different data layers in the playback apparatus of FIG. 3 just as in the embodiment of FIG. 1, another selection means consisting of a plurality of different colored filters 60 and 62 equal in number to the data layers is shown in FIG. 3. In this case, the light source 12 is not a laser, but a suitable source of intense "white" light of many frequencies, and the record element 10 includes data layers of different optical properties, such as different colored dyes or different colored photoluminescent materials, as shown by record 10' in FIG. 6.

Figure 6:
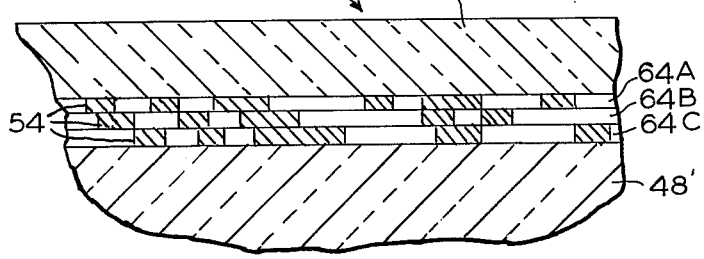
FIG. 6 is an enlarged section view of a portion of a third embodiment of a multi-layer optical data record without spacer layers.

The record 10' of FIG. 6 includes data layers 64A, 64B and 64C which are directly layered on each other without the use of spacer layers, similar to layers 52 of FIG. 4, between such data layers. This is possible because selection of the data layers is not accomplished by changing the focus plane, but by the color filters 60 and 62 in the selection means shown in FIG. 3. As stated earlier, the data layers 64A, 64B and 64C are of different optical properties. Thus the data spots in the three data layers may be made of different colored dyes including the subtractive wavelength dyes used in color photographic film or of different light emission wavelength photoluminescent materials in plastic binder layers. The data layers 64A, 64B and 64C are of extremely small thickness on the order of 0.1 mil or less, since they are all within the same field of focus of the light beam.

The filters 60 and 62 equal in number to the data layers are selectively positioned in front of the detector 14 by an electric motor 66 which may be a step motor controlled by a suitable control circuit 68 for properly indexing the filters which are carried on a rotating support plate 70 attached to the motor shaft 72. The filters can be of the additive or band pass type which transmit light of the wave lengths blocked by the colored data spots in the data layers which are formed of subtractive or band reject color dyes. The data spots of different colored dyes can be formed by multiple exposure and development of color photographic film with different colored light beams so that the data layers are provided by the different emulsion layers of such film. However, the data spots of different photoluminescent materials may also be formed by printing or by photoresist etching techniques in a similar manner to the data spots of the record of FIG. 4. Also, the record 10' of FIG. 6 can be made as a reflective type record and used in the playback apparatus of FIG. 1 if a reflective layer is provided between the substrate 48 and the bottom data layer 64C in a similar manner to FIG. 5.

Figure 5:
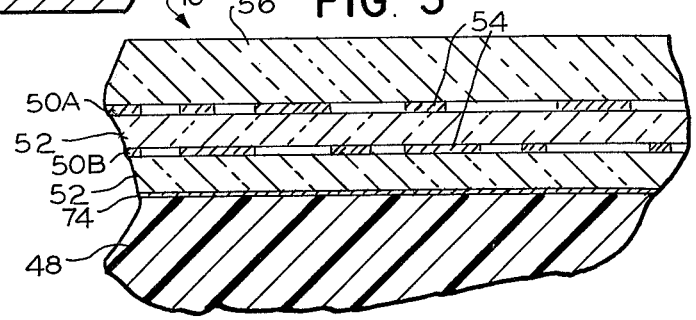
FIG. 5 is an enlarged section view of a portion of another embodiment of the multi-layer optical data record of the present invention with a reflection layer separate from the data layers.

The record 10" of FIG. 5 is a reflective type record similar to that of FIG. 4, except that the data bits 54 are made of light opaque material, and a light reflecting metal layer 74 is provided between the substrate 48 and a spacer layer 52 beneath the bottom data layer. Thus, the record 10" of FIG. 5 is a reflective type record even though neither the data bits 54 nor the surrounding background material of the data layers is of light reflecting material. Of course, the reflecting layer 74 can be provided by the surface of the substrate if such substrate is made of metal, rather than plastic, which may be preferred for dimensional stability.

Figure 7:
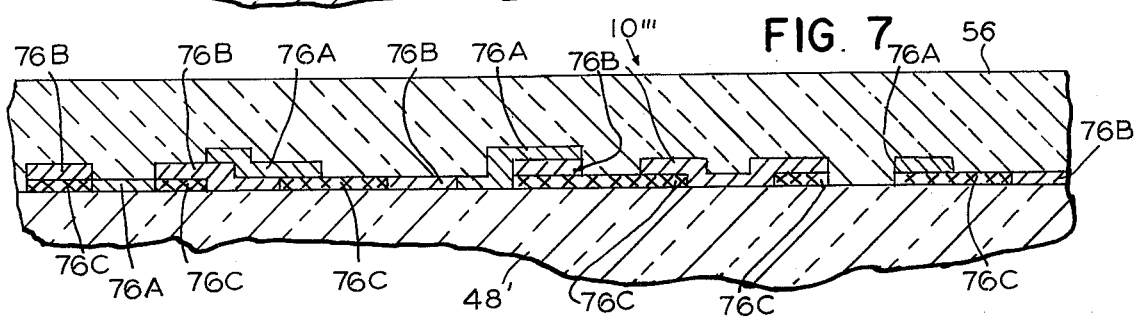
FIG. 7 is an enlarged section view of a portion of a fourth embodiment of the multi-layer optical data record without spacer layers.

A fourth embodiment of the multi-layered optical data record 10''' is shown in FIG. 7 to be of the direct layered type like that of FIG. 6, which does not use spacer layers between its data layers 76A, 76B and 76C, but is formed differently than the embodiment of FIG. 6. Thus, the data layers 76A, 76B and 76C in the record of FIG. 7 may be formed by evaporating the different colored dyes or photoluminescent material of the data spots through a mask, by mechanical printing or by using a photoresist etching process. The lower data layer 76C is applied to the surface of the substrate first, then the data layer 76B and finally the upper data. For this reason, the data layer 76B contacts layer 76C and the surface of the substrate through holes in layer 76C in some places, while layer 76A contacts the substrate and both the other layers 76B and 76C. These data layers are formed of materials of different optical properties similar to that of record 10' of FIG. 6, including subtractive color dyes or photoluminescent materials which emit different colored light when struck by the readout light beam.

Selective readout of the data layers in the records of FIGS. 6 and 7 may be accomplished simultaneously by using a plurality of detectors and associated filters and providing beam splitting mirrors in a similar manner to that disclosed in U.S. patent application Ser. No. 375,336, referred to above. On those records in which the data spots are transparent and the surrounding background areas are opaque or reflective, it will be necessary to make the background areas partially transparent, for example approximately 50% transparent, so that sufficient light can reach the lower data layer to enable playback.

The data layers 50 and spacer layers 52 of FIGS. 4 and 5 can be formed in separate sheets and glued together and to the substrate member by a suitable solvent for the plastic material. However, photographic film strips exposed with different data tracks and developed may be used as both the data layers and the spacer layers since the latter are formed by the transparent film backing layers. The film strips are transmitted through a tank of glue or solvent and then attached to the substrate member and passed through pressure rollers prior to drying. It should be noted that color slide photographic film has a plurality of different color emulsion layers which can be used directly as the data layers to form a record like that of FIG. 6, since chemical development and processing can be carried out through the upper layers. However, in this case, there would be multiple exposures of the film to different colored light beams to form the data tracks on the different data layers. Finally, it should be noted that for records using photoluminescent material of different light emission properties to distinguish between the data layers, the playback light beam may preferably be of ultraviolet light since most conventional photoluminescent materials are more sensitive to ultraviolet.

It will be obvious to those having ordinary skill in the art that many changes may be made in the details of the above-described preferred embodiments of the invention without departing from the basis of the invention. Therefore, the scope of the present invention should only be determined by the following claims.

I claim:

1. A multi-layered optical data record comprising:
   a base member including a first side and a second side separated by the thickness of said base member;
   a plurality of optical data layers on said base member having optical data information spots recorded as a plurality of spaced data spots thereon, including first and second data layers of different data provided on the same side of at least one of said first and second sides of said base member;
   said first and second data layers being contiguous so that corresponding surfaces of said layers are separated by a distance less than the thickness of said base member; and
   said first and second data layers each having complete data recorded thereon so that only one data layer at a time is used to modulate readout light and thereby produce a readout signal of the data in said one layer.

2. A record in accordance with claim 1 in which the data spots are frequency modulated or pulse width modulated analog information.

3. A record in accordance with claim 1 in which the data spots are digital information.

4. A record in accordance with claim 1 in which the data layers have photographically recorded data provided thereon.

5. A record in accordance with claim 1 in which the data layers include portions of light reflective material.

6. A record in accordance with claim 1 in which the data layers include portions of light opaque material.

7. A record in accordance with claim 6 in which a light reflective surface is provided on the side of the base member adjacent said data layers.

8. A record in accordance with claim 1 in which a plurality of data layers are provided on both sides of said base member including third and fourth data layers on the other side of said base member.

9. A record in accordance with claim 1 in which the first and second data layers are separated from each other by a spacer layer of light transparent material.

10. A record in accordance with claim 1 in which the first and second data layers are in contact with each other and are made of optically different materials.

11. A record in accordance with claim 10 in which the data layers are made of different colored dyes.

12. A record in accordance with claim 10 in which the data layers are made of different photoluminescent materials.

* * * * *